(12) United States Patent
Landsmann et al.

(10) Patent No.: US 12,334,844 B2
(45) Date of Patent: Jun. 17, 2025

(54) METHOD AND DEVICE FOR IDENTIFYING THE ANISOTROPHY OF AN ELECTRIC THREE-PHASE MACHINE

(71) Applicant: KOSTAL Drives Technology GmbH, Luedenscheid (DE)

(72) Inventors: Peter Landsmann, Munich (DE); Sascha Kuehl, Munich (DE); Dirk Paulus, Munich (DE)

(73) Assignee: KOSTAL Drives Technology GmbH, Luedenscheid (DE)

( * ) Notice: Subject to any disclaimer, the term of this patent is extended or adjusted under 35 U.S.C. 154(b) by 147 days.

(21) Appl. No.: 18/482,379

(22) Filed: Oct. 6, 2023

(65) Prior Publication Data

US 2024/0030851 A1 Jan. 25, 2024

Related U.S. Application Data

(63) Continuation of application No. PCT/EP2021/061571, filed on May 3, 2021.

(51) Int. Cl.
*H02P 21/18* (2016.01)
*H02P 25/022* (2016.01)

(52) U.S. Cl.
CPC ............ *H02P 21/18* (2016.02); *H02P 25/022* (2013.01)

(58) Field of Classification Search
CPC ......... H02P 21/18; H02P 25/022; H02P 6/183
USPC .................................................. 318/466, 445
See application file for complete search history.

(56) References Cited

U.S. PATENT DOCUMENTS

| 7,592,761 B2 * | 9/2009 | MacKay | ................... H02P 6/20 |
| | | | 318/254.1 |
| 2021/0194398 A1 | 6/2021 | Landsmann et al. | |

FOREIGN PATENT DOCUMENTS

DE       102018006657 A1     2/2020

OTHER PUBLICATIONS

The International Bureau of WIPO, International Preliminary Report on Patentability for International Application No. PCT/EP2021/061571 issued Oct. 24, 2023.
European Patent Office, International Search Report for International Application No. PCT/EP2021/061571, dated Jan. 31, 2022.

\* cited by examiner

*Primary Examiner* — David Luo
(74) *Attorney, Agent, or Firm* — Brooks Kushman P.C.

(57) ABSTRACT

A method for identifying magnetic anisotropy of an electric three-phase machine having a rotor and a stator is provided. The method includes actuating the machine with a periodic injection voltage via clocked clamping voltages according to a pulse width modulation (PWM) scheme having a switching frequency. An electric current of the machine responsive to the machine being actuated by the periodic injection voltage is cyclically measured at a sampling frequency. The periodic injection voltage has a period that is less than twice a period of the sampling frequency. An inductance and/or an admittance of the machine is determined based on the periodic injection voltage and the measured electric current. A position of the rotor is determined based on the inductance and/or the admittance of the machine. The machine is controlled according to the rotor position.

10 Claims, 5 Drawing Sheets

METHOD AND DEVICE FOR IDENTIFYING THE ANISOTROPHY OF AN ELECTRIC THREE-PHASE MACHINE

CROSS-REFERENCE TO RELATED APPLICATIONS

This application is a continuation of International Application No. PCT/EP2021/061571, published in German, with an international filing date of May 3, 2021, the disclosure of which is hereby incorporated in its entirety by reference herein.

TECHNICAL FIELD

The present invention relates to controlling and monitoring a synchronous machine without using a rotor position sensor or encoder.

BACKGROUND

The now well-established high-performance and high-efficiency control of synchronous machines is based on knowledge of the rotor position signal. So-called rotor position feedback allows the use of efficiency- and power-optimized motor control methods, as well as the fulfillment of higher-order tasks such as rotational speed control or positioning. The measurement of the rotor position generally takes place during operation by use of a sensor that is mounted at the rotor shaft, the so-called rotor position sensor or "sensor" for short.

Sensors have a number of disadvantages, for example increased system costs, reduced robustness, increased likelihood of failure, and large installation space requirements, which has prompted interest by major industries in obtaining the position signal without use of a sensor.

Methods that allow this are referred to as "sensorless" closed-loop control, and are divided into two classes:

1. Fundamental wave methods evaluate the voltage induced by movement. At average and high rotational speeds, they provide very good signal properties, but they fail in the lower rotational speed range, in particular when the machine is at a standstill.

2. Anisotropy methods evaluate the position dependency of the inductance of the machine. This requires no minimum rotational speed (the methods thus also function when the machine is at a standstill) but requires the additional application of high-frequency voltage signals, so-called injection. Anisotropy methods have numerous problems and obstacles, which explains why, even today, a position sensor (with its disadvantages) must be used in many applications.

Anisotropy methods may be further subdivided into two stages. The first stage is anisotropy identification, which is calculated from the supplied voltage and the resulting current response, the components of the anisotropy vector. Examples of methods relating to this first stage are found in bibliography references [1], [2], [3], [4], and [5]. The second stage is rotor position assignment, in which a rotor position is assigned to the measured anisotropy vector. Examples of methods relating to this second stage are found in bibliography references [6], [7], [8], and [9]. The present invention relates to the first stage and is suitable for combination with any method of the second stage.

For identifying the anisotropy, high-frequency voltage signal components are superimposed on the fundamental voltage by the current controller, which is referred to as voltage injection, or injection for short. These high-frequency components, also in a standstill of the rotor, result in a high-frequency change in current, the so-called injection response, from which the inductance or the admittance of the machine may be calculated. The injection methods proposed in the literature differ primarily with regard to the underlying injection pattern and the algorithms for admittance calculation thus required. Thus, for example, injection takes place in a pulsed manner in (bibliography reference [1]), in a rotating manner in (bibliography reference [2]), in an alternating manner in (bibliography reference [3]), as a square in (bibliography reference [5]), and as a triangle in (bibliography reference [4]), it being possible to also evaluate other injection forms only with the latter method. Among these methods, the alternating injection supplies only incomplete information concerning the admittance, since only two of three dimensions of the admittance of a three-phase machine can be determined, which for advanced evaluation methods (bibliography reference [10]) is inadequate. Triangular injection and square injection are the fastest rotating special cases of rotating injection, and for this purpose each use a time-discrete evaluation rule.

One of the greatest obstacles for the use of anisotropy methods is the acoustic noise caused by the injection (usually "beeping" in the lower rotational speed range), since this may hamper or prevent use of the sensorless drive close to humans.

Injection methods are known for their acoustic noise emissions, since the injection gives rise to slight magnetic field variations and thus mechanical vibrations, which may be irradiated from the motor housing, among other locations, at a more or less high sound level. This noise emission is often perceived as objectionable and hinders the use of sensorless methods in applications close to humans. Design measures or also the selection of an injection frequency outside a resonance frequency of the motor housing may reduce the noise. However, subjectively completely noise-free injection is possible only when the injection frequency is placed above the auditory threshold.

$$f_{inj} \geq 20 \text{ kHz} \qquad (1)$$

As a function of the length my of the injection pattern, for which, for example, for alternating injection $n_{inj}=2$, for triangular injection $n_{inj}=3$, or for square injection $n_{inj}=4$, previous methods require at least a $n_{inj}$-fold current sampling frequency fs in order to detect the injection response of a silent injection.

$$f_s = n_{inj} f_{inj} \geq n_{inj} * 20 \text{ kHz} \qquad (2)$$

A high sampling frequency in itself is not problematic.

However, for inexpensive current measurement principles such as so-called emitter shunt measurement (measuring shunts in the lower branch of the half bridges), only one current value detection per pulse width modulation (PWM) period is possible, and for this reason previous methods for silent injection require at least the following PWM frequency $f_{pwm}$:

$$f_{pwm} = f_s = n_{inj} f_{inj} \geq n_{inj} * 20 \text{ kHz} \qquad (3)$$

This means that, by use of an inexpensive current measurement principle, alternating injection may be implemented noiselessly only above a PWM frequency $f_{pwm} \geq 40$ kHz, triangular injection only above a PWM frequency $f_{pwm} \geq 60$ kHz, and square injection only above a PWM frequency $f_{pwm} \geq 80$ kHz, whereas without injection methods, a 20 kHz PWM is already noiseless. This multiple increase of the PWM frequency results in significant disadvantages with regard to switching losses, electromagnetic compatibility (EMC), and voltage precision, among other things, which overall may prevent use of the sensorless method.

SUMMARY

Embodiments of the present invention provide for identifying the magnetic anisotropy of an electric three-phase machine having a rotor and a stator. The machine is actuated by way of clocked terminal voltages in accordance with the method of pulse-width modulation. The current (i.e., the current response) of the machine resulting from the machine being actuated by the clocked terminal voltages is measured cyclically. A periodic injection voltage is superposed on the fundamental voltage, and the present inductance and/or admittance of the machine is calculated from the applied voltage and the measured current, with the aim of determining the current position of the rotor. The period length of the injection voltage is shorter than double the cycle time of the current measurement.

A method for identifying magnetic anisotropy of an electric three-phase machine having a rotor and a stator. The method includes actuating the machine with a periodic injection voltage via clocked clamping voltages according to a pulse width modulation (PWM) scheme having a switching frequency. The method further includes cyclically measuring at a sampling frequency an electric current of the machine responsive to the machine being actuated by the periodic injection voltage. The periodic injection voltage has a period that is less than twice a period of the sampling frequency. The method further includes determining an inductance and/or an admittance of the machine based on the periodic injection voltage and the measured electric current, determining a position of the rotor based on the inductance and/or the admittance of the machine, and controlling the machine according to the rotor position.

A device for open-loop and closed-loop control of a three-phase machine including a stator and a rotor is provided. The device includes a controllable PWM converter for outputting clocked clamping voltages, an apparatus for detecting a number of phase currents, and a controller for controlling the PWM converter. The controller is configured to perform the method.

A synchronous machine including a stator, a rotor with or without permanent magnets, and the device is also provided.

The presented method shows, via a certain implementation of the first stage of anisotropy methods, the so-called anisotropy identification, how a noise that is perceivable by humans may be completely avoided without having to increase the switching frequency by several times, using inexpensive hardware.

For this purpose, the Nyquist-Shannon sampling theorem is disregarded in a targeted manner, and the injection is applied at a frequency that is more than one-half the sampling frequency. It is shown that by the use of certain evaluation equations, the anisotropy information may then be obtained from so-called alias signals of the current response.

In the field of signal analysis, alias effects typically refer to errors that occur when signal frequency components are present in the signal to be sampled which are higher than the half sampling frequency, also referred to as the Nyquist frequency. Such frequency components are interpreted as lower frequencies, the term "alias" expressing the fact that the higher frequencies, in a manner of speaking, are output as a different (lower) frequency. To prevent alias effects, for example low pass filters are used to filter out the frequency components in question. Within the scope of the present invention, these alias signals are not regarded as undesirable, but, rather, are even utilized in a very targeted manner.

In one particular embodiment, by the additional selection of a certain voltage pattern, possible weak noise, which in some cases may result from the superimposition of injection and fundamental voltage, is eliminated.

BRIEF DESCRIPTION OF THE DRAWINGS

The present invention is explained below with reference to the figures in general, and in various embodiments. In the figures.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "machine" is used here in the sense of an "electric machine," i.e., an electric motor or an electric generator.

For high-frequency excitation, the admittance Y of a synchronous machine corresponds approximately to the inverse inductance L; for magnetically anisotropic behavior, both are described as a matrix.

$$Y_s^s \approx L_s^{s-1} \qquad (4)$$

The superscript stands for the coordinate system (KS), in this case stator coordinates; the subscript describes the parameter in greater detail, in this case the reference of the parameter for the stator winding. The admittance describes the conversion of a voltage vector $u_s^s$, which is being excited, into a current response $\Delta i_s^s$ $$\Delta i_S^s = Y_S^s u_S^s \Delta t \tag{5}$$

$$\begin{bmatrix} \Delta i_\alpha \\ \Delta i_\beta \end{bmatrix} = \begin{bmatrix} Y_{\alpha\alpha} & Y_{\alpha\beta} \\ Y_{\beta\alpha} & Y_{\beta\beta} \end{bmatrix} \begin{bmatrix} u_\alpha \\ u_\beta \end{bmatrix} \Delta t \tag{6}$$

$\Delta t$ is the time period in which the voltage $u_s^s$ was applied, and analogously, $\Delta i$ is the difference between current values $i_s^s$ before and after this time period. When the shaft rotates and/or a fundamental current is adjusted, even further interfering terms are introduced into equation (5), which within the scope of the anisotropy identification must be compensated for.

Alternatively, the anisotropy identification may also determine the inductance $L_s^s$ $$u_S^s = L_S^s \frac{\Delta i_S^s}{\Delta t} \tag{7}$$

The inductance $L_s^s$ contains equivalent anisotropy information, and thus in the same way may be assigned to a rotor position. The above derivation takes place using the example of an identified admittance $Y_s^s$, but is not limited thereto.

The objective of the anisotropy identification is now to deduce, from the pattern of the voltage $u_s^s$ being excited (injection, for example) and the resulting current response $i_s^s$, the magnetic anisotropy—namely, the so-called anisotropy vector $y_\Delta^s$, whose entries are a linear combination of certain components of the admittance matrix $Y_s^s$ $$y_\Delta^s = \begin{bmatrix} y_{\Delta\alpha} \\ y_{\Delta\beta} \end{bmatrix} = \frac{1}{2} \begin{bmatrix} Y_{\alpha\alpha} - Y_{\beta\beta} \\ Y_{\alpha\beta} + Y_{\beta\alpha} \end{bmatrix} \tag{8}$$

For many machines, this vector $y_\Delta^s$ shows a marked rotor position dependency. In addition, for certain methods the isotropic component $Y_\Sigma$, which may be calculated via a further linear combination, is also relevant.

$$Y_\Sigma = \frac{1}{2}(Y_{\alpha\alpha} + Y_{\beta\beta}) \tag{9}$$

Figure 1:
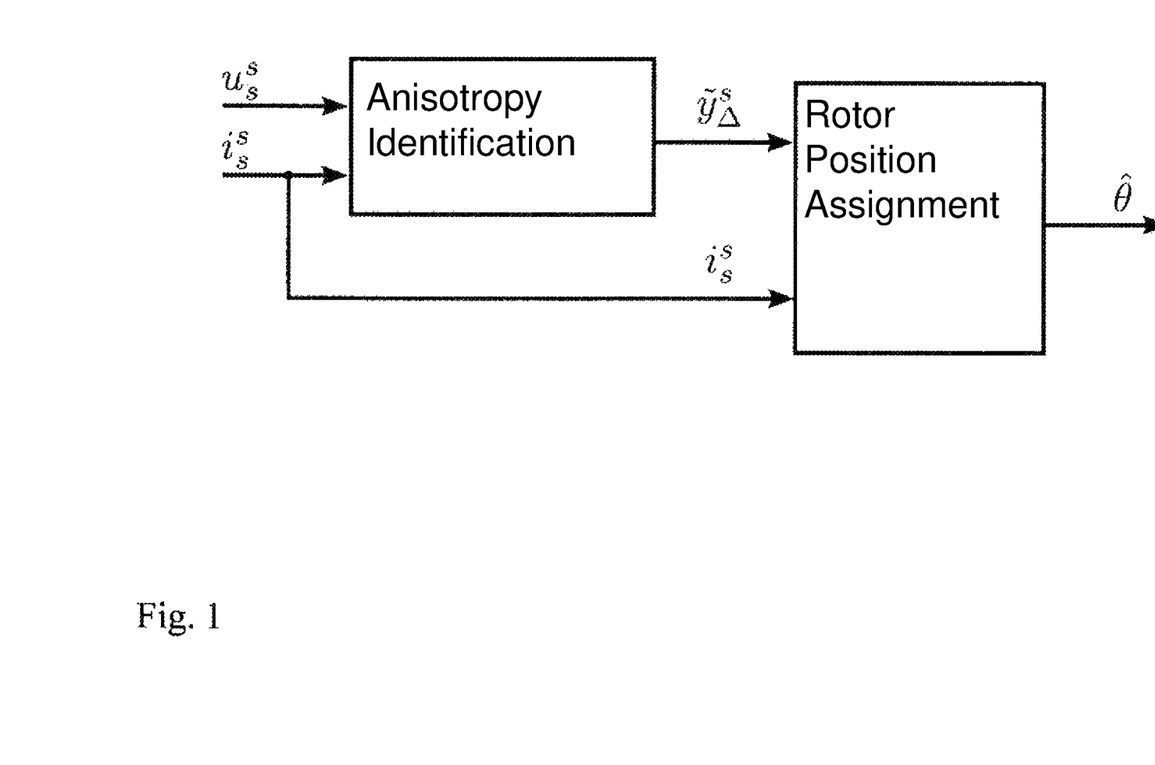
FIG. 1 shows a block diagram of the two-stage design of anisotropy methods, a distinction being made between anisotropy identification and rotor position assignment.

In summary, anisotropy-based methods may be subdivided into two stages, illustrated in FIG. 1. The first stage is the anisotropy identification, which calculates the components of the anisotropy vector from the supplied voltage and the measured current response. This anisotropy vector, which is calculated based on the present measurement, is referred to as the measured anisotropy vector $\tilde{y}_\Delta^s$, and in contrast to the physical machine property $y_\Delta^s$, contains, for example, typical measurement errors such as noise, etc. The second stage is the rotor position assignment, in which a rotor position estimated value $\hat{\theta}$ is assigned to the measured anisotropy vector $\tilde{y}_\Delta^s$. The present invention relates to the first stage, the anisotropy identification.

According to the explanation above, the objective of obtaining the highest possible injection frequency $f_{inj}$ at the lowest possible PWM frequency $f_{pwm}$ is limited by the detection of the measured current value, but strictly speaking, only because all previous approaches seek to detect the actual injection response. According to the Nyquist-Shannon sampling theorem, for this purpose the sampling frequency must be greater than double the signal frequency; i.e., in order to detect the actual injection response, at least two measured values per injection period must be detected.

Figure 2:
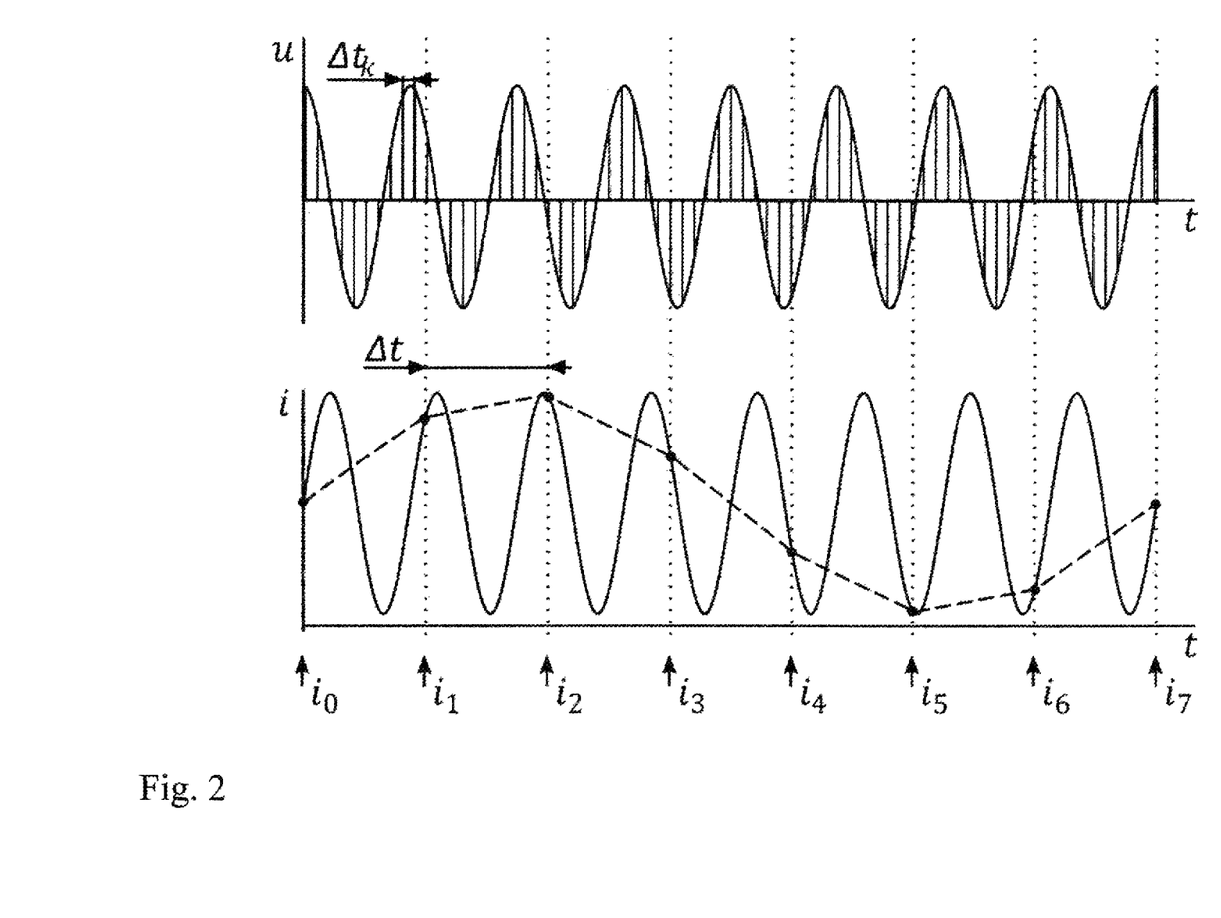
FIG. 2 shows the temporal pattern of voltage u with sinusoidal injection (top) and resulting current i (bottom, smooth), and the alias pattern of the current sampling values (bottom, angular) when the current sampling frequency is lower than double the injection frequency. Also marked are the interval time $\Delta t_k$ of a subvoltage $u_k$, the interval time $\Delta t$ of the current sampling, and via the arrows, the sampling times of the current values $i_0$ through $i_7$, which in the bottom angular curve have been connected by straight line segments.

The basic concept of the present invention is that, while disregarding the Nyquist-Shannon sampling theorem, specifically, using a period duration of the injection voltage that is shorter than double the cycle time of the current measurement, instead of measuring nothing, for example, a so-called alias signal $i_A^s$ of the actual injection response (see FIG. 2, dashed line) is measured, and that this alias signal $i_A^s$ relates to the associated alias signal of the injection voltage over the same admittance value as the actual injection signals in equation (5).

$$\Delta i_A^s = Y_s^s u_A^s \Delta t \tag{10}$$

The actual objective of gaining the admittance information may thus also be achieved when only an alias signal, not the complete injection response, is detected. The only requirement is that the injection frequency must not be an integral multiple of the sampling frequency, so that the corresponding alias signal does not result as zero.

Because the voltage is not sampled in the same way as the current, but instead the reference voltage is typically used, the following calculation rule is to be followed to obtain the alias signal of the injection voltage $u_A^s$ $$u_A^s = \frac{1}{\Delta t} \sum_{k=1}^n u_k^s \Delta t_k \tag{11}$$

k is the number index and n is the number of the various subvoltage values $u_k^s$ that have been applied between two current samples, each with a time period $\Delta t_k$. The subvoltage values correspond to the voltage reference value, or to the average voltage over at least one half PWM period.

This weighted average value formation (equation (11)) of the actual injection form (triangle, square, etc.) results in an alias voltage value $u_A^s$, which via equation (10) is in a relation with the measured alias current response $\Delta i_A^s$. Thus, for calculating the admittance, a voltage value may be used which, as a weighted average value of at least two different subvoltage values, is calculated with a weighting with the duration of the particular voltage application.

As an alternative to the alias voltage, an alias flux difference $\Delta \psi_A^s$ may be calculated:

$$\Delta \psi_A^s u_A^s \Delta t = \Sigma_{k=1}^n u_k^s \Delta t_k \tag{12}$$

The alias flux difference $\Delta \psi_A^s$ would then be inserted into equation (10) instead of the associated product.

In one exemplary embodiment, a subjectively noise-free injection is applied at $f_{inj}=20$ kHz, and the current response is sampled at $f_s=30$ kHz, for which purpose, for example for emitter shunt measurement (measuring shunts in the lower branch of the half bridges of the power electronics), whose fastest possible cycle time equals the PWM period duration, a PWM frequency of only $f_{pwm}=30$ kHz is necessary. In the current signal after the sampling $\Delta i_A^s$, a vibration at $f_A=-10$ kHz is then apparent. If the voltage application undergoes a corresponding calculation according to equation (11), then a $-10$ kHz vibration also results for the injection voltage; the vibration may be set in equation (10) to the current response $\Delta i_A^s$ via the actual admittance $Y_s^s$. The $-10$ kHz vibration is only a time-discretely apparent signal, and the actual, time-continuous injection has 20 kHz as the lowest frequency component, and therefore is not audible.

Figure 3:
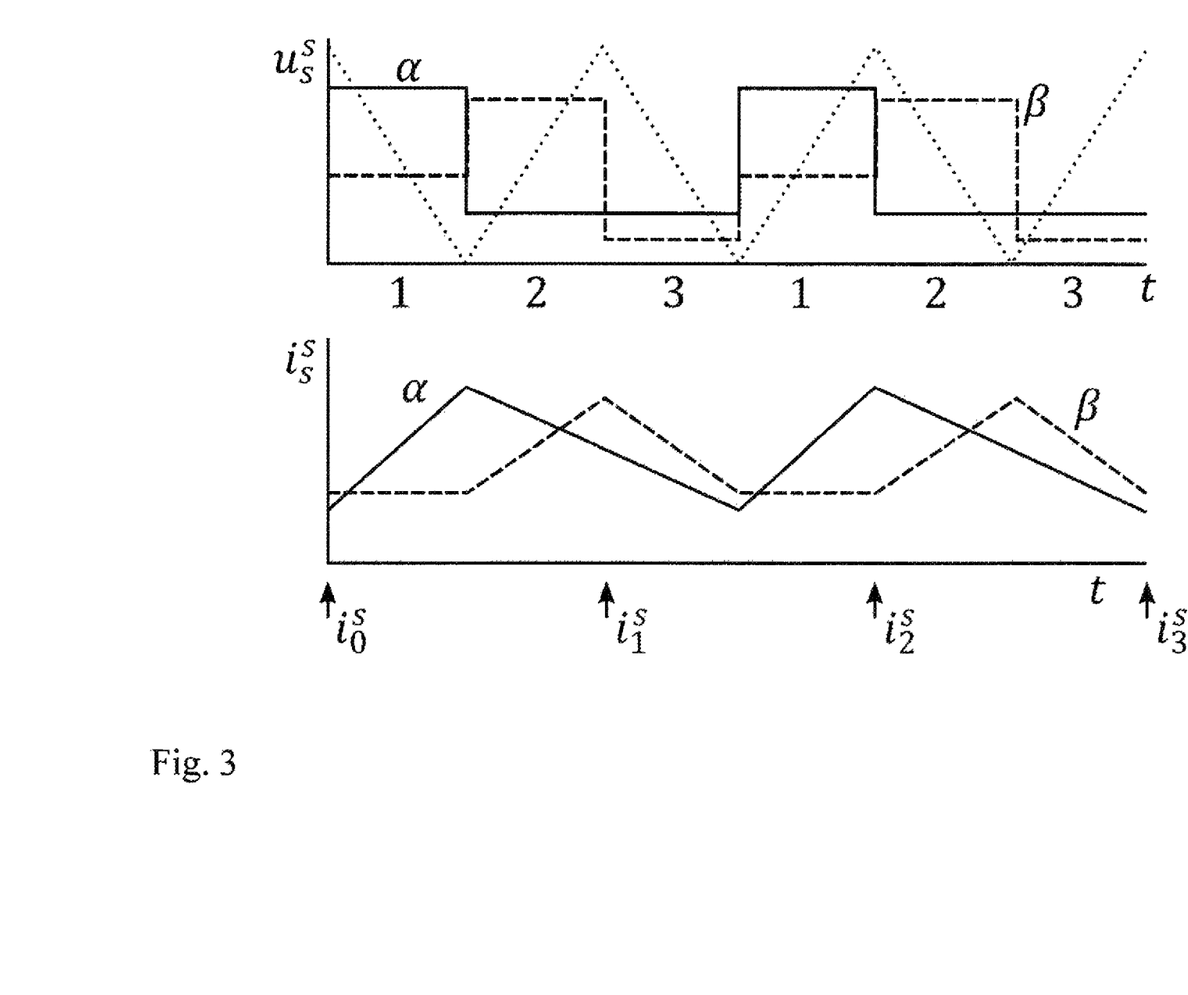
FIG. 3 shows an example of a temporal pattern of voltage in stator coordinates $u_s^{\ s}=[u_\alpha u_\beta]^T$ (top portion) and current in stator coordinates $i_s^{\ s}=[i_\alpha i_\beta]^T$ (bottom portion) during a triangular voltage injection at a frequency of ⅔ the PWM frequency and current sampling frequency. The α component is depicted in each case by a solid line, the β component in each case by a dashed line, and the PWM counter by a dotted line. At the top point of the PWM counter, all half bridges are switched through at the bottom, and the current sampling takes place.
Figure 4:
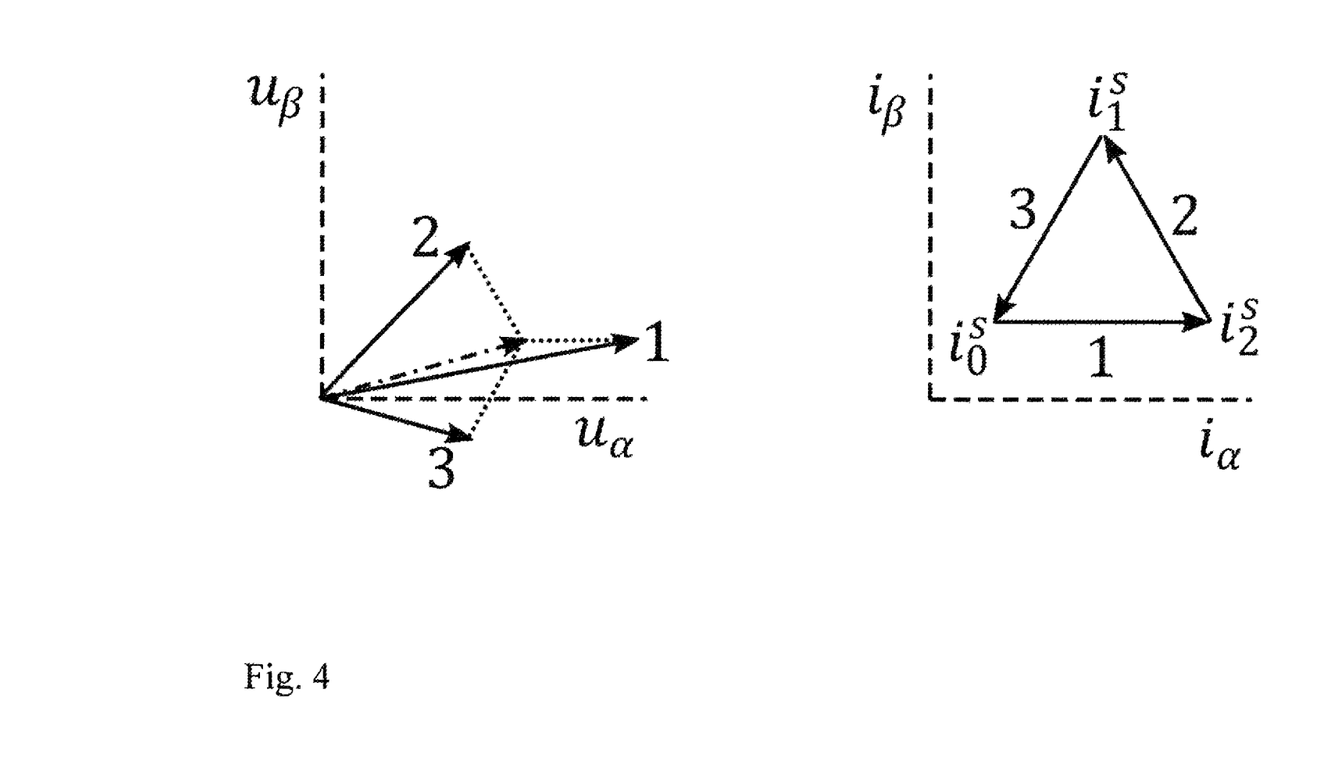
FIG. 4 shows an illustration of the pattern from FIG. 3 in Cartesian stator coordinates for depicting the injection pattern and the reversed rotational direction between the actual injection and the alias signal.

In one specific exemplary embodiment, a different voltage value is set in each half-period of the 30 kHz PWM, resulting in a rotating injection at $f_{inj}$=20 kHz by means of a triangular injection pattern, as illustrated by way of example in the top portion of FIG. 3 on a component-by-component basis over time, and in the left portion of FIG. 4 in stator-fixed coordinates. Thus, two injection periods have the same duration as three periods of the pulse width modulation. The injection voltage is added to the fundamental voltage in the direction of phase a in injection step 1, in the direction of phase b in step 2, and in the direction of phase c in step 3. As illustrated in the bottom portion of FIG. 3 and in the right portion of FIG. 4, this likewise results with a 20 kHz rotating current response, which is sampled by means of emitter shunt measurement at $d_s$=30 kHz. The sampling times are marked by the arrows in FIG. 3, resulting in the measured current values and $i_0{}^s$, $i_1{}^s$, $i_2{}^s$, and $i_3{}^s$. In the right portion of FIG. 4 it is apparent how these measured values in stator coordinates are situated with backward rotation. These measured values result in the rotating alias signal with $\Delta i_A{}^s$ with $f_A$=−10 kHz, which according to equation (10) is in a relation with the alias voltage per equation (11).

Figure 5:
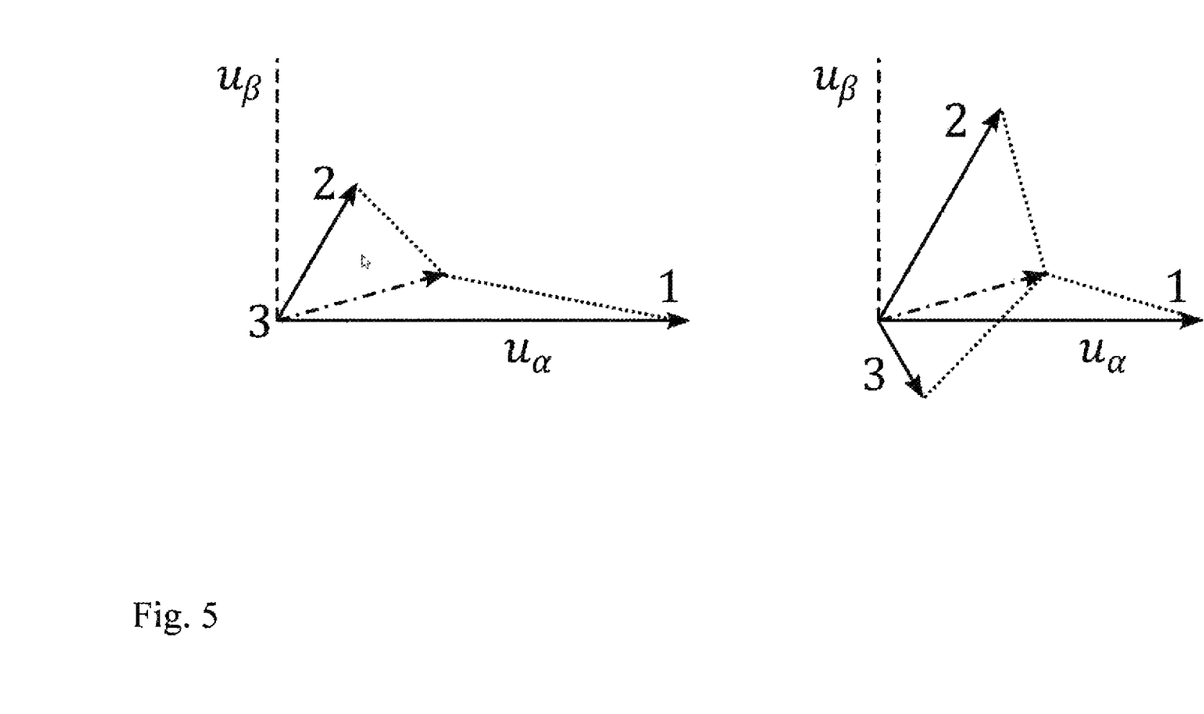
FIG. 5 shows generation of an injection and a fundamental voltage by means of three subvoltage pointers, each of which is oriented solely in the phase direction, and whose PWM patterns are thus made up only of an active switching state in each case.

In a further exemplary embodiment, the injection is not simply added to the fundamental voltage; instead, three different subvoltage values (pointers) are set in three successive PWM half-periods, each of the pointers being precisely aligned with a phase axis (a, b, or c), and having a difference from one another that corresponds at least to the injection amplitude. Two such pointer sequences are illustrated by way of example in FIG. 5. The magnitude of each subvoltage pointer is selected in such a way that the fundamental voltage required by the current controller results as the average value of the three pointers.

In the left pointer sequence by way of example, the pointers planned by the space vector modulation from the fundamental voltage are each simply separately set with a triple magnitude, as the result of which one pointer (in this case, the third pointer) is necessarily zero. If the resulting difference between the three pointers is not sufficient with regard to the injection amplitude, then an equal value may optionally be added (or subtracted) to/from all three pointers, which, as illustrated in the left portion of FIG. 5, does not affect the average voltage value but increases the injection component. When the temporal sequence of the phase axes used is equal in each injection cycle, the injection frequency, i.e., in the above example 20 kHz, also results as the lowest frequency component for this specific injection form.

The particular advantage of such a conversion of the fundamental wave component and the injection component lies in the suppression of weak frequency components in the audible range, which arise when the fundamental voltage and the injection voltage overlap when odd-numbered injection patterns are combined with symmetrical PWM. With such a combination, for example the pointer 1 is generated in an injection cycle with a falling PWM counter, and in the following injection cycle is generated with a rising PWM counter (see FIG. 3), resulting in interchanging of the switching state order for construction of the pointer from the symmetrical PWM. This interchanging repeats in every other injection cycle, so that weak noise may result at one-half injection frequency. This noise is avoided when no (interchangeable) switching state combination is set in each PWM half-interval, but instead, by means of setpoint pointers in the phase direction, only individual switching states are set which cannot be interchanged by the PWM.

BIBLIOGRAPHY

[1] M. Schrödl, "Detection of the rotor position of a permanent magnet synchronous machine at standstill," IEEE Conf. ICEM, pp. 51-56, 1988.
[2] P. L. Jansen and R. D. Lorenz, "Transducerless position and velocity estimation in induction and salient AC machines," IEEE Trans. on Industrial Applications, Vol. 31, pp. 240-247, 1995.
[3] M. J. Corley and R. D. Lorenz, "Rotor position and velocity estimation for a salient-pole permanent magnet synchronous machine at standstill and high speeds," IEEE Trans. on Industrial Applications, Vol. 34, pp. 784-789, 1998.
[4] D. Paulus, P. Landsmann and R. Kennel, "Sensorless field-oriented control for permanent magnet synchronous machines with an arbitrary injection scheme and direct angle calculation," IEEE Conf. SLED, pp. 41-46, 2011.
[5] P. Landsmann, DE, EP, WO Patent DE 102015217986 A1, 2015.
[6] D. Paulus, P. Landsmann, S. Kuehl and R. Kennel, "Arbitrary injection for permanent magnet synchronous machines with multiple saliencies," in IEEE Conf. ECCE, Denver, 2013.
[7] T. Frenzke, "Impacts of cross-saturation on sensorless control of surface permanent magnet synchronous motors," in Conf. EPE, Dresden, 2005.
[8] D. Reigosa, P. Garcia, D. Raca, F. Briz and R. D. Lorenz, "Measurement and Adaptive Decoupling of Cross-Saturation Effects and Secondary Saliencies in Sensorless-Controlled IPM Synchronous Machines," in IEEE Industry Applications Annual Meeting, New Orleans, 2007.
[9] S. Paulus and G. Gotting, "Self-sensing control of permanent-magnet synchronous machines with reluctance and saturation effects using high frequency signal injection," in APEC, Long Beach, 2013.
[10] P. Landsmann, D. Paulus and S. Kithl, "Method and device for closed-loop control of a synchronous motor without a position sensor by unambiguous assignment of the admittance or inductance to the rotor position". DE, WO Patent DE 102018006657 A1, Aug. 17, 2018.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method for identifying magnetic anisotropy of an electric three-phase machine having a rotor and a stator, the method comprising:
actuating the machine with a periodic injection voltage via clocked clamping voltages according to a pulse width modulation (PWM) scheme having a switching frequency;
cyclically measuring at a sampling frequency an electric current of the machine responsive to the machine being actuated by the periodic injection voltage, wherein the periodic injection voltage has a period that is less than twice a period of the sampling frequency;

determining an inductance and/or an admittance of the machine based on the periodic injection voltage and the measured electric current;

determining a position of the rotor based on the inductance and/or the admittance of the machine; and controlling the machine according to the rotor position.

2. The method of claim 1 wherein:
the period of the sampling frequency is greater than a period of the switching frequency of the PWM scheme.

3. The method of claim 1 wherein:
two periods of the periodic injection voltage are equal to three periods of the PWM scheme.

4. The method of claim 1 wherein:
the step of cyclically measuring the electric current of the machine takes place via measuring shunts in a lower branch of half bridges of power electronics of the machine.

5. The method of claim 1 wherein:
the step of determining the inductance and/or the admittance of the machine based in part on the periodic injection voltage includes determining the inductance and/or the admittance of the machine based in part on a value of the periodic injection voltage that is calculated as a weighted average value of at least two different subvoltage values, weighted with a duration of a voltage application of same.

6. The method of claim 5 wherein:
the subvoltage values each correspond to an average voltage over at least one half-period of the switching frequency of the PWM scheme.

7. The method of claim 5 wherein:
an orientation of each set subvoltage value is aligned with a phase axis, and only a magnitude of the subvoltage value is changeable.

8. The method of claim 7 wherein:
a temporal sequence of the phase axes is equal in each periodic voltage injection cycle.

9. A device for open-loop and closed-loop control of a three-phase machine including a stator and a rotor, the device comprising a controllable pulse width modulation (PWM) converter for outputting clocked clamping voltages, an apparatus for detecting a number of phase currents, and a controller for controlling the PWM converter, wherein the controller is configured to perform the method of claim 1.

10. A synchronous machine, comprising a stator, a rotor with or without permanent magnets, and the device of claim 9.

* * * * *